(12) United States Patent
Kaufmann et al.

(10) Patent No.: US 9,457,748 B1
(45) Date of Patent: Oct. 4, 2016

(54) MOTOR VEHICLE WITH ENVIRONMENT MONITORING SYSTEM

(71) Applicant: Audi AG, Ingolstadt (DE)

(72) Inventors: Anton Kaufmann, Teugn (DE); Wolfgang Dorfner, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/811,487

(22) Filed: Jul. 28, 2015

(30) Foreign Application Priority Data

Jul. 29, 2014 (DE) .................. 10 2014 011 218

(51) Int. Cl.
| | | |
|---|---|---|
| *B60R 21/01* | (2006.01) | |
| *B60R 21/34* | (2011.01) | |
| *B60R 21/013* | (2006.01) | |

(52) U.S. Cl.
CPC ............ *B60R 21/01* (2013.01); *B60R 21/013* (2013.01); *B60R 21/34* (2013.01); *B60R 2021/01013* (2013.01); *B60R 2021/346* (2013.01); *B60R 2300/101* (2013.01); *B60R 2300/50* (2013.01); *B60R 2300/8033* (2013.01)

(58) Field of Classification Search
CPC ..... B60R 21/01; B60R 21/013; B60R 21/34; B60R 2300/50; B60R 2300/101; B60R 2300/8033; B60R 2021/01013; B60R 2021/346
See application file for complete search history.

(56) References Cited

U.S. PATENT DOCUMENTS

| | | | | |
|---|---|---|---|---|
| 7,260,461 B2* | 8/2007 | Rao | ...................... | B60R 19/483 180/271 |
| 7,500,756 B2* | 3/2009 | Ito | ............................ | B60R 1/00 340/461 |
| 7,721,838 B2* | 5/2010 | Takahashi | ........... | B60R 21/0136 180/274 |
| 2006/0265130 A1* | 11/2006 | Mattes | ................ | B60R 21/0132 701/301 |

(Continued)

FOREIGN PATENT DOCUMENTS

| | | |
|---|---|---|
| DE | 102 58 626 | 7/2004 |
| DE | 10 2008 049207 | 1/2010 |

(Continued)

OTHER PUBLICATIONS

European Search Report issued on Dec. 2, 2015 with respect to counterpart European patent application EP 15 00 1628.

(Continued)

*Primary Examiner* — Darlene P Condra
(74) *Attorney, Agent, or Firm* — Henry M. Feiereisen LLC.

(57) ABSTRACT

A motor vehicle includes a radiator cowling in a front region of the motor vehicle, and an environment monitoring system to check a surrounding area of the motor vehicle. The environment monitoring system includes an environment detection device, a sensor which is mounted onto the radiator cowling and which is operably connected to the detection device and configured to ascertain an immediate region in front of the motor vehicle, and an actuator configured to pivot the radiator cowling between at least two pivot positions about a pivot axis extending substantially in vehicle transverse direction to thereby modify a detection range ascertained by the sensor.

20 Claims, 3 Drawing Sheets

(56) References Cited

U.S. PATENT DOCUMENTS

| | | | |
|---|---|---|---|
| 2008/0135740 A1* | 6/2008 | Matsuda | B60R 1/00 250/226 |
| 2008/0151053 A1* | 6/2008 | Ishii | B60R 1/00 348/148 |
| 2009/0143967 A1* | 6/2009 | Lee | B60R 1/00 701/119 |
| 2009/0242308 A1* | 10/2009 | Kitte | B60R 21/36 180/271 |
| 2009/0322880 A1* | 12/2009 | Lin | B60R 11/04 348/148 |
| 2011/0184610 A1* | 7/2011 | Laliron | B60Q 1/0023 701/49 |
| 2012/0062741 A1* | 3/2012 | Stimel, Jr. | B60R 1/00 348/148 |
| 2013/0057846 A1* | 3/2013 | Mahlisch | G01S 17/023 356/4.07 |
| 2013/0270027 A1* | 10/2013 | Huth | B60R 21/013 180/271 |

FOREIGN PATENT DOCUMENTS

| | | |
|---|---|---|
| DE | 102008062534 | 6/2010 |
| DE | 10 2010 026268 | 3/2011 |
| DE | 102010026268 | 3/2011 |
| EP | 2 289 768 | 3/2011 |
| JP | 58 030874 | 2/1983 |

OTHER PUBLICATIONS

Translation of European Search Report issued on Dec. 2, 2015 with respect to counterpart European patent application EP 15 00 1628.

* cited by examiner

MOTOR VEHICLE WITH ENVIRONMENT MONITORING SYSTEM

CROSS-REFERENCES TO RELATED APPLICATIONS

This application claims the priority of German Patent Application, Serial No. 10 2014 011 218.7, filed Jul. 29, 2014, pursuant to 35 U.S.C. 119(a)-(d), the disclosure of which is incorporated herein by reference in its entirety as if fully set forth herein.

BACKGROUND OF THE INVENTION

The present invention relates to a motor vehicle with an environment monitoring system to check a surrounding area of a motor vehicle.

The following discussion of related art is provided to assist the reader in understanding the advantages of the Invention, and is not to be construed as an admission that this related art is prior art to this invention.

To provide a driver and/or driver assist system with a broadest possible range of information about the surrounding area of the motor vehicle, numerous sensors are typically installed in the motor vehicle. To assist the driver in particular when maneuvering or parking, information about the vehicle environment in immediate proximity of the vehicle is wanted. The immediate vehicle environment can be displayed to the driver using so-called "top view" representations for example, which project images taken by cameras in a travel plane and displayed for the driver. To provide the driver during maneuvering substantially accurate information about the driver's position in relation to surrounding obstacles, so-called "corner view" cameras are used which display the immediate vehicle environment in the area of the corners of the motor vehicle, i.e. in particular in the area of the front left and right ends of the bumper of the motor vehicle. For this purpose several individual cameras are used to depict the front corner areas of the motor vehicle. The use of a common camera for both corner areas can also be used.

The placement of the camera typically requires a compromise between pleasing look, optimum detection range, and camera protection and thus a certain minimum distance from the road surface. An appropriate installation site could be a radiator grille. However, such an installation site has the drawback that the design in this region does not allow the camera to adequately image the immediate area in front of the motor vehicle. The outline of the radiator grille and the license plate make it impossible to monitor an area directly in front of the vehicle, when using cameras or other sensors that are arranged on the radiator grille.

It would therefore be desirable and advantageous to provide an improved motor vehicle to obviate prior art shortcomings and to enable a better viewing range of a sensor for ascertaining an immediate area in front of the motor vehicle.

SUMMARY OF THE INVENTION

According to one aspect of the present invention, a motor vehicle includes a radiator cowling in a front region of the motor vehicle, and an environment monitoring system to check a surrounding area of the motor vehicle, the environment monitoring system including an environment detection device, a sensor which is mounted onto the radiator cowling and which is operably connected to the environment detection device and configured to ascertain an immediate region in front of the motor vehicle, and an actuator configured to pivot the radiator cowling between at least two pivot positions about a pivot axis extending substantially in vehicle transverse direction to thereby modify a detection range ascertained by the sensor.

The sensor may be provided to image in particular the ground-proximal vehicle environment in the forward region of the motor vehicle. The actuator can be operated in particular by the environment detection device, when a situation is recognized in which an expansion of the detection range in the direction of the vehicle front is desired or required. Activation can be implemented, when the vehicle speed drops below a minimum speed, or when a parking procedure is recognized, or as a result of an operator's input.

A pivoting of the radiator cowling from a normal position during travel can involve a movement of an upper edge of the radiator cowling forwards in relation to the motor vehicle to thereby tilt the radiator cowling. As a result, the detection range of the sensor is shifted in the direction toward the vehicle front.

The actuator may be a linearly operating actuator which, for example, shifts via a slotted guide an upper region of the radiator cowling forwards in relation to the motor vehicle or draws a lower region of the radiator cowling in the direction toward the rear of the motor vehicle. As an alternative, the actuator may also be a rotatorily operating actuator which rotates the radiator cowling in it entirety or in part in relation to the pivot axis. The radiator cowling or the pivotable part of the radiator cowling can be supported against an elasticity so that the radiator cowling can tilt in one direction, when the actuator is activated by the environment detection device to apply a force, whereas the elasticity restores the normal position of the radiator cowling by reversing the pivoted motion, when removing the force. There are numerous further ways to configure the actuator and the radiator cowling in order to implement a pivoting in accordance with the present invention.

The radiator cowling may be a shroud of an engine radiator and may be made in one piece, in which case the entire radiator cowling is pivoted. It is also possible to make the radiator cowling of multiple parts so that one or more segments of the radiator cowling can be pivoted by the actuator. It is also conceivable to differently pivot various segments by separate actuators. The pivot axis about which the radiator cowling can be pivoted in its entirety or in part can, for design reasons or manufacturing tolerances, be oriented such that a small angle of less than 10°, in particular less than 5°, is defined between the vehicle transverse direction and the pivot axis.

According to another advantageous feature of the present invention, the sensor may be a camera, e.g. a wide-angle camera. An arrangement of a wide-angle camera in a region of the radiator cowling that is central with respect to the vehicle transverse direction enables a display of both front corner regions of the motor vehicle. As a result, the vehicle environment can be monitored in an optimum manner while still keeping the number of sensors to a minimum. As an alternative, one camera may be mounted to the radiator cowling at the left edge and one camera at the right edge of the radiator cowling.

According to another advantageous feature of the present invention, the sensor can be rigidly mounted onto the radiator cowling. As the proximal region in front of the motor vehicle should be displayed, the sensor can be mounted to the radiator cowling in such a way that in all pivot positions of the radiator cowling the sensor has in relation to the vehicle transverse direction a detection angle which is inclined in the direction of a roadway.

According to another advantageous feature of the present invention, the pivot axis can extend in a lower half of the radiator cowling. Advantageously, the pivot axis extends in a lower third of the radiator cowling. As a result, relatively small pivot angles of the radiator cowling cause a substantial displacement of the sensor, especially when rigidly mounted to the radiator cowling. Advantageously, the sensor can be arranged in the upper half of the radiator cowling, in particular in the upper third thereof.

According to another advantageous feature of the present invention, the environment detection device can be operably connected to a display device such as to display a separate left-hand display area and a separate right-hand display area, with the left-hand display area displaying first data of the sensor relating to a left and front vehicle environment, and with the right-hand display area displaying second data of the sensor relating to a right and front vehicle environment. The display mode of the detection device may hereby be selectable by the operator or can be automatically chosen in the presence of predefined vehicle situations. The environment detection device can hereby be configured to activate the actuator in the described display mode for pivoting the radiator cowling in order to shift a detection range of the sensor in the direction toward the vehicle front.

According to another advantageous feature of the present invention, a pedestrian protection system may be provided to activate the actuator, when a further sensor ascertains an imminent collision of a pedestrian with the front region of the motor vehicle, so as to pivot the radiator cowling into a predefined one of the pivot positions. By tilting the radiator cowling outwards, in particular in the upper region of the radiator cowling, it becomes possible for an additional element to yield in a controlled manner in the event of a collision with a pedestrian so that the hip region in particular of a pedestrian can be protected. The predefined pivot position may be specified mechanically or by the pedestrian protection system. As an alternative, the predefined pivot position may be specified in dependence of parameters of the pedestrian protection system.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
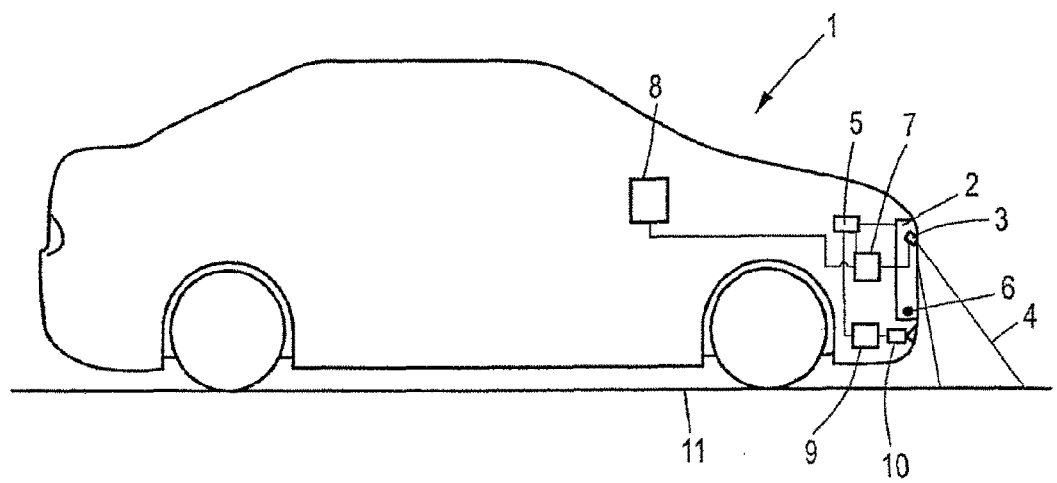
FIG. 1 is a simplified illustration of a motor vehicle according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 4:
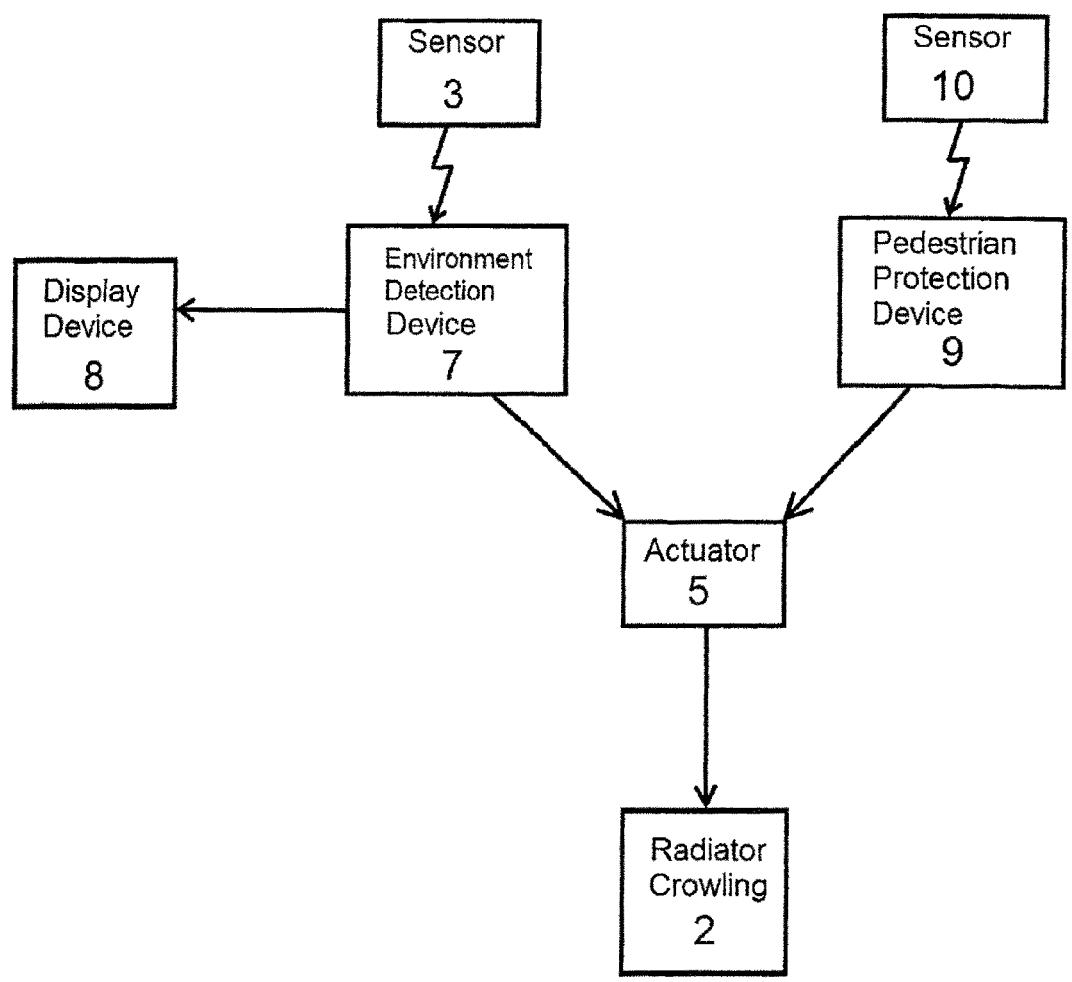
FIG. 4 is a block diagram showing the relationship and operation of components of an environment monitoring system according to the invention.

Turning now to the drawing, and in particular to FIG. 1, there is shown a simplified illustration of a motor vehicle according to the present invention, generally designated by reference numeral 1. The motor vehicle 1 includes a radiator cowling 2 arranged in a front region of the motor vehicle 1, and an environment monitoring system which is illustrated in FIG. 4 by way of a block diagram showing the relationship and operation of components of the environment monitoring system. The environment monitoring system includes a sensor 3, e.g. a wide-angle camera, arranged on the radiator cowling 2.

The sensor 3 has a detection range 4 which covers an area of the roadway 11 in front of the motor vehicle 1. Due to the actual design of the motor vehicle 1, the area of the roadway 11 in immediate proximity in front of the motor vehicle 1 is not covered by the detection range 4 of the sensor 3. In order to be able to shift the detection range 4 with respect to the motor vehicle 1, the environment monitoring system of the motor vehicle 1 includes an actuator 5 by which the radiator cowling 2 can be pivoted about a pivot axis which is defined by a pin 6 and extends in vehicle transverse direction. This will be described in greater detail hereinafter with reference to FIGS. 2 and 3.

Figure 2:
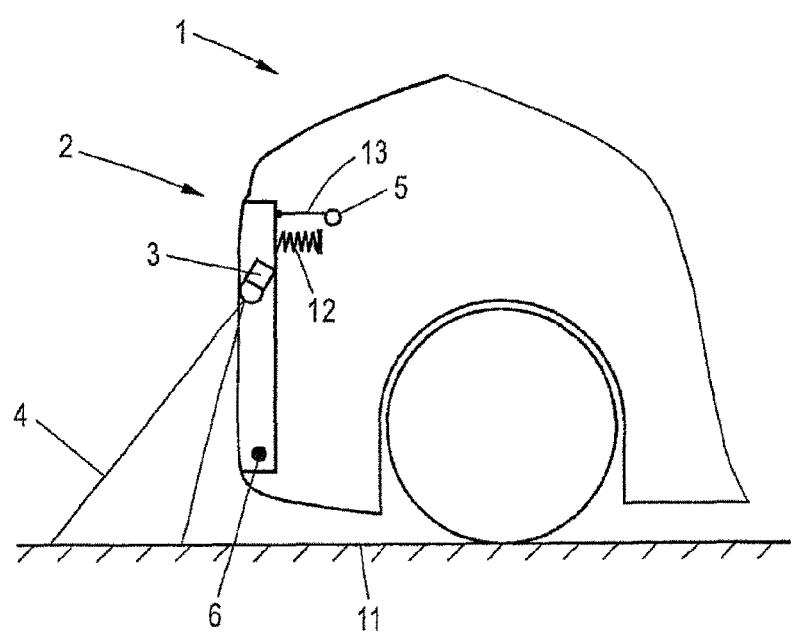
FIG. 2 is an enlarged detailed view of the motor vehicle of FIG. 1, depicting a radiator cowling in a first pivot position.

FIG. 2 shows an enlarged detailed view of the motor vehicle 1, depicting the radiator cowling 2 in a first pivot position which is assumed by the radiator cowling 2 during normal travel of the motor vehicle 1. In the non-limiting example shown here, the actuator 5 is a rotary actuator having a flexible string 13 which is securely connected with the radiator cowling 2 at an upper part thereof. Winding and unwinding of the string 13 of the actuator 5 can be implemented by an environment detection device 7 and a pedestrian protection system 9. The radiator cowling 2 is supported by the pin 6 and is maintained under tension by the string 13 against an elasticity 12. For sake of simplicity and ease of illustration, the elasticity 12 is shown here by way of example as a separate spring element. The invention is, however, not limited to the configuration of the elasticity 12 in the form of a spring element, as other constructions are conceivable as well. For example, the elasticity 12 may also be formed by a deformable region of the radiator cowling 2.

Figure 3:
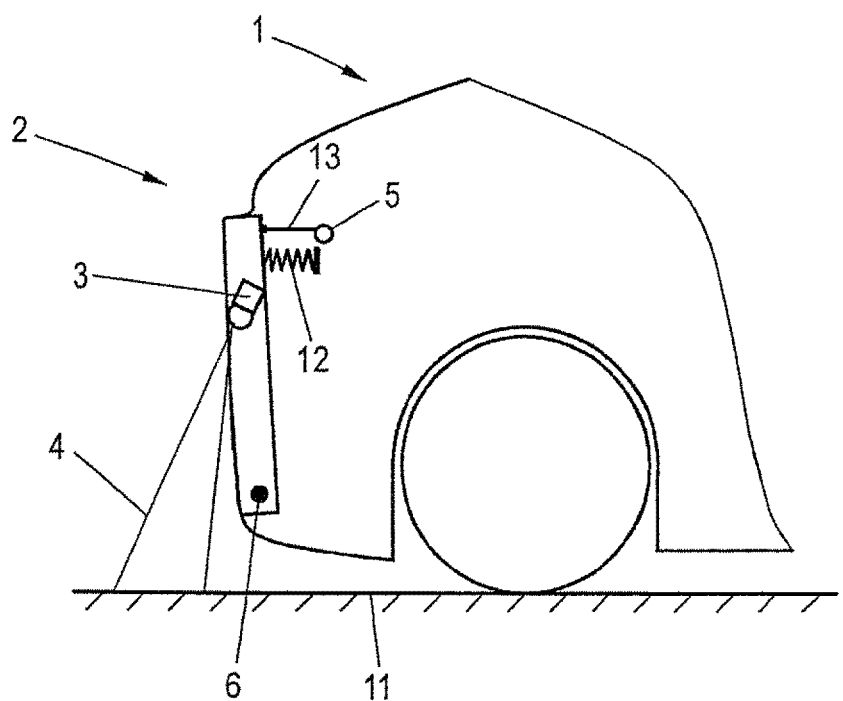
FIG. 3 is an enlarged detailed view of the motor vehicle of FIG. 1, depicting the radiator cowling in a second pivot position.

When the actuator 5 is caused by the pedestrian protection system 9 or the environment detection device 7 to unwind the string 13, the elasticity 12, as shown in FIG. 3, pushes against the radiator cowling 2 at an upper part of the radiator cowling 2 to thereby tilt the radiator cowling 2 about the pivot axis 6. As the radiator cowling 2 pivots, the detection range 4 of the sensor 3 is shifted in the direction towards the vehicle front and the viewing angle of the sensor 3 becomes steeper with respect to the roadway 11. Thus, tilting of the radiator cowling 2 enables a monitoring of those areas of the roadway 11 that are in close proximity of the motor vehicle 1.

The motor vehicle 1 further includes a display device 8 which is controlled by the environment detection device 7 such that a separate left-hand and a separate right-hand display area can be imaged, with the left-hand display area displaying first data of the sensor 3 relating to a left and front vehicle environment, and with the right-hand display area displaying second data of the sensor 3 relating to a right and front vehicle environment. In this "corner view" mode, the front corners of the motor vehicle 1 are thus displayed so that maneuvering of the motor vehicle 1 is facilitated. A respective mode of the environment detection device 7 can be activated in particular for parking procedures of the motor vehicle 1. This can be implemented by a not shown operating element of the motor vehicle 1. The operating mode of the environment detection device 7 is activated in addition by a driver assist system after determination that a maneuvering procedure has commenced. As soon as the described mode of the environment detection device 7 is activated, the environment detection device 7 operates the actuator 5 to tilt the radiator cowling 2 and thereby shift the detection range 4 of the sensor 3 in the direction towards the vehicle front.

The pedestrian protection system 9, provided in the motor vehicle 1, is operably connected to a further sensor 10 which monitors the area in front of the motor vehicle 1 and transmits respective data to the pedestrian protection system 9. When the pedestrian protection system 9 determines, after evaluation of the transmitted data, a risk of an imminent collision with a pedestrian, the actuator 5 is activated to tilt the radiator cowling 2 about a pivot angle which has been predefined in dependence on data from the sensor 10 and further motor vehicle parameters in order to realize an optimum protection of the pedestrian's hip region.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
    a radiator cowling in a front region of the motor vehicle; and
    an environment monitoring system to check a surrounding area of the motor vehicle, said environment monitoring system including
        an environment detection device,
        a sensor mounted onto the radiator cowling, said sensor being operably connected to the environment detection device and configured to ascertain an immediate region in front of the motor vehicle, and
        an actuator configured to pivot the radiator cowling between at least two pivot positions about a pivot axis extending substantially in vehicle transverse direction to thereby modify a detection range ascertained by the sensor.

2. The motor vehicle of claim 1, wherein the sensor is a camera.

3. The motor vehicle of claim 2, wherein the camera is a wide-angle camera.

4. The motor vehicle of claim 2, wherein the camera is arranged in a region of the radiator cowling that is central with respect to the vehicle transverse direction.

5. The motor vehicle of claim 1, wherein the sensor is rigidly mounted onto the radiator cowling.

6. The motor vehicle of claim 1, wherein the pivot axis extends in a lower half of the radiator cowling.

7. The motor vehicle of claim 1, wherein the pivot axis extends in a lower third of the radiator cowling.

8. The motor vehicle of claim 1, further comprising a display device, said environment detection device being operably connected to the display device such as to display a separate left-hand display area and a separate right-hand display area, with the left-hand display area displaying first data of the sensor relating to a left and front vehicle environment, and with the right-hand display area displaying second data of the sensor relating to a right and front vehicle environment.

9. The motor vehicle of claim 1, wherein the environment monitoring system includes a pedestrian protection system configured to activate the actuator, when the sensor ascertains an imminent collision of a pedestrian with the front region of the motor vehicle, so as to pivot the radiator cowling into a predefined one of the pivot positions.

10. The motor vehicle of claim 1, wherein the radiator cowling is pivoted about the pivot axis in its entirety.

11. The motor vehicle of claim 1, wherein a part of the radiator cowling is pivoted about the pivot axis.

12. The motor vehicle of claim 1, wherein the detection range of the sensor is shifted in a direction of the vehicle front by pivoting the part of the radiator cowling forwards in relation to the motor vehicle.

13. The motor vehicle of claim 12, wherein the part is an upper part of the radiator cowling.

14. The motor vehicle of claim 1, wherein the environment monitoring system includes an elasticity to return the radiator cowling to an initial one of the pivot positions.

15. The motor vehicle of claim 14, wherein the actuator maintains the radiator cowling under tension so as to be urged against the elasticity.

16. The motor vehicle of claim 15, wherein the actuator has a string configured for winding and unwinding and connected to the radiator cowling such as to urge the radiator cowling against the elasticity.

17. The motor vehicle of claim 14, wherein the elasticity is a spring element.

18. The motor vehicle of claim 1, wherein the pivot axis is oriented such that an angle of less than 10° is defined between the vehicle transverse direction and the pivot axis.

19. The motor vehicle of claim 1, wherein the pivot axis is oriented such that an angle of less than 5° is defined between the vehicle transverse direction and the pivot axis.

20. The motor vehicle of claim 1, wherein the sensor is mounted to the radiator cowling in such a way that in the pivot positions of the radiator cowling the sensor has in relation to the vehicle transverse direction a detection angle which is inclined in a direction of a roadway.

* * * * *